United States Patent Office 3,268,488
Patented August 23, 1966

3,268,488
URETHANE PREPOLYMER FROM A MIXTURE OF A POLYETHER GLYCOL AND A POLYHYDRIC ALCOHOL
Herbert L. Heiss, New Martinsville, W. Va., assignor to Mobay Chemical Company, Pittsburgh, Pa., a corporation of Delaware
No Drawing. Continuation of application Ser. No. 314,873, Oct. 9, 1963, which is a continuation of application Ser. No. 817,479, June 2, 1959. This application June 1, 1965, Ser. No. 460,563
8 Claims. (Cl. 260—77.5)

This invention relates generally to the preparation of an adduct suitable for use in preparation of polyurethane plastics and more particularly to a novel adduct of this type.

This application is a continuation of my copending application, Serial No. 314,873, now abandoned, filed by me on October 9, 1963, which is a continuation of my application, Serial No. 817,479, filed on June 2, 1959, now abandoned, which is a continuation-in-part of my application, Serial No. 373,035, filed August 7, 1953, now abandoned, and which in turn was a continuation-in-part of my application, Serial No. 300,968, filed July 25, 1952, now abandoned.

It has been proposed heretofore to prepare a polyurethane plastic such as, for example, a cellular polyurethane plastic, by reacting an adduct having urethane linkages and terminal —NCO groups with a chain extender such as water, polyhydric alcohol, or polyamine. One method for making a cellular polyurethane plastic in which a prepolymer is prepared under substantially anhydrous conditions in a first step, and then reacted in a second step with water, is disclosed in U.S. Patent 2,726,219. In accordance with that process the prepolymer is prepared by reacting a polyalkylene ether glycol with an excess of an arylene diisocyanate. The prepolymer is then reacted in a second step with a large excess of water. The product resulting from such a process must be dried because of the large excess of water used. It is very difficult to control the density of the resulting product when using only difunctional compounds and the product does not always have the proper rebound and compression set characteristics. Consequently, the product does not have physical characteristics which make it useful for some upholstery applications.

It has also been proposed to prepare a polyurethane from a polyalkylene ether glycol and an organic diisocyanate in British Patent 733,624. The process disclosed in this patent is a molding process in which an intermediate product or adduct is reacted with a triol. In accordance with that process, a polyalkylene ether glycol is reacted with an excess of diisocyanate and the resulting prepolymer is then chain extended and cross-linked by reaction with trimethylol propane or the like, to produce a nonporous or noncellular product.

It is an object of this invention to provide a method for making an adduct particularly well suited for further reaction with a chain extender to prepare a polyurethane of improved physical characteristics. Another object of the invention is to provide a method for making an adduct or prepolymer from a polyalkylene ether glycol and a polyisocyanate and containing urethane linkages and terminal —NCO groups. A further object of the invention is to provide an improved adduct prepared from a polyalkylene ether glycol and a polyisocyanate particularly well-suited for making a cellular polyurethane for upholstery. A more specific object of the invention is to provide a method for making an adduct or prepolymer from a polyalkylene ether glycol adapted for making a cellular polyurethane having improved hysteresis.

The foregoing objects and others are accomplished in accordance with this invention, generally speaking, by providing a method for making an adduct adapted for reaction with a chain extender or cross-linker to form a polyurethane plastic wherein an organic polyisocyanate is reacted under substantially anhydrous conditions with a mixture of a polyalkylene ether glycol having a molecular weight of at least about 350 and a polyhydric alcohol having a molecular weight of less than 500 in admixture therewith. The polyhydric alcohol contemplated by this invention must have at least three and preferably not more than four alcoholic hydroxyl groups and must be free from tertiary nitrogen atoms. Preferably the polyhydric alcohol is a monomeric trihydric alcohol. It has been found that an adduct containing urethane linkages and having terminal —NCO groups prepared in accordance with the process of this invention is particularly well suited for making cellular polyurethane having predetermined compression set and rebound characteristics. The resulting cellular polyurethane may be used to advantage as upholstery in furniture or vehicles, as a sponge, as rug underlay and in many other commercial applications.

Any suitable polyalkylene ether glycol free from a tertiary nitrogen atom and having a molecular weight of at least about 350 and preferably from about 1,000 to about 4,000 may be used. The polyalkylene ether glycol may be prepared by condensation of an alkylene oxide such as, for example, propylene oxide, ethylene oxide, butylene oxide or the like, or mixtures thereof, or by condensation of one of these oxides with a suitable glycol such as, for example, ethylene glycol, diethylene glycol, propylene glycol, butylene glycol or the like. One method for condensing alkylene oxides to produce a polyalkylene ether glycol suitable for use in this invention is disclosed in U.S. Patent 1,922,459. Preferably the glycol is a polypropylene glycol having a molecular weight of at least about 1,000. A polyalkylene ether glycol prepared from both ethylene oxide and propylene oxide is also particularly advantageous. The polyalkylene ether glycol may also be the polymerization product of tetrahydrofuran. Preferably, the polyalkylene ether glycol has an hydroxyl number of not more than about 320 and seldom will it be less than about 40.

Any suitable polyhydric alcohol having at least three hydroxyl groups and preferably not more than four hydroxyl groups and a molecular weight of less than about 500 may be used in combination with the polyalkylene ether glycol in preparation of the adduct or prepolymer provided by this invention provided that it does not contain any tertiary nitrogen atoms. Examples of suitable alcohols include glycerine, trimethylol propane, trimethylol ethane, pentaerythritol, 1,2,4-butanetriol, 1,2,6-hexanetriol, 1,2,5-pentanetriol, sucrose, sorbitol, or the like. A polyhydric alcohol having hetero oxygen or sulfur atoms in the chain may be used.

Any suitable organic polyisocyanate, but preferably an organic diisocyanate, may be used in accordance with this invention. Examples of suitable organic polyisocyanates are disclosed in U.S. Patent 2,764,565. Included among the more suitable polyisocyanates are the arylene diisocyanates, 2,4-toluylene diisocyanate, 2,6-toluylene diisocyanate, 4,4'-diphenyl methane diisocyanate, 1,5-napthalene diisocyanate and the like. Of all of these diisocyanates, an isomeric mixture of 20 percent 2,6-diisocyanate and 80 percent 2,4-diisocyanate gives best results. At least enough organic polyisocyanate is used to react with all of the hydroxyl groups of the polyhydric alcohol and polyalkylene ether glycol and to provide terminal —NCO groups on the prepolymer.

The prepolymer may be formed by mixing the polyalkylene ether glycol with the polyhydric alcohol and the resulting mixture then reacted with the polyisocyanate. Alternately, the glycol, polyhydric alcohol and polyisocyanate may be mixed together substantially simultaneously. The reaction should be carried out under substantially anhydrous conditions; i.e. the reaction mixture should not contain more than from about 0.05 to about 0.5 part water per 100 parts polyakylene ether glycol-triol mixture. Preferably the reaction mixture should contain less than 0.1 part water per 100 parts polyalkylene ether glycol-triol mixture. Preferably, an excess of organic diisocyanate should be used in order to provide a product containing urethane linkages and terminal —NCO groups. Preferably, from about 1.1 to about 5.0 equivalents organic polyisocyanate are used for each equivalent of polyhydric alcohol and polyalkylene ether glycol. In other words at least about 1.1 equivalents organic polyisocyanate is used if the sum of equivalents of polyhydric alcohol and equivalents of polyalkylene ether glycol is 1.

The ratio of organic polyisocyanate to alcohols is best expressed in "equivalents" because both trihydric and dihydric alcohols are used. The term "equivalents" is used in the sense that one mol diisocyanate is two equivalents, one mol glycol is two equivalents and one mol trihydric alcohol is three equivalents.

The reaction can be accelerated by heating the mixture to from about 40° C. to about 150° C. Any amount of triol in the reaction mixture results in an improvement but it is preferred to use from about 0.5 to about 30 parts by weight triol and from about 70 parts to about 99.5 parts polyalkylene ether glycol. The prepolymer formed in this way is a thick viscous liquid and is storage stable providing none of the compounds used in its preparation contain a tertiary nitrogen atom.

Any suitable apparatus may be used for mixing the various compounds together. The apparatus described in U.S. Patent 2,764,565 may be used or the reactive components may be mixed together in any suitable container provided with an agitator. If desired, the polyalkylene ether glycol and polyol mixture may be heated until the triol dissolves in the glycol and the polyisocyanate may be added to the mixture. The prepolymer provided by this invention may be reacted with water to form a cellular polyurethane having improved rebound characteristics for cushioning. Usually from about 1 to about 5 parts by weight water per 100 parts prepolymer is used for this purpose. The apparatus disclosed in U.S. Patent 2,764,565 may be used to mix the prepolymer with water and a suitable catalyst such as those disclosed in that patent. This prepolymer can be converted into a coating by dissolving it and any known organic chain extender such as, for example, an alcohol including ethylene glycol, diethylene glycol, glycerine or the like or a diamine such as, for example, ethylene diamine or the like in a suitable solvent. The prepolymer can be converted into a solid nonporous polyurethane elastomer by heating it with one of these organic chain extenders. Processes for making coatings and nonporous polyurethane elastomers from such prepolymers are known in the art and do not form a part of this invention.

In order better to describe and further clarify the invention the following are specific embodiments thereof.

*Example 1*

About 100 parts by weight of polyethylene ether glycol prepared by condensing ethylene oxide and having an average molecular weight of about 400 are mixed with about 15.3 parts glycerine. About 175 parts 2,4-toluylene diisocyanate are added to the mixture at room temperature. Chemical reaction is affected at a temperature of about 70° C. and under substantially anhydrous conditions until a thick liquid adduct having terminal —NCO groups is formed. This prepolymer can be mixed with water and a suitable tertiary amine catalyst such as N-ethyl morpholine to form a cellular polyurethane.

If about 290 parts of a solvent such as benzene or toluene are included in the reaction mixture, the prepolymer is obtained as a solution suitable for use as a coating or for making hard surfaces.

*Example 2*

About 100 parts by weight of polypropylene ether glycol prepared by condensing propylene oxide and having an average molecular weight of about 1,000 and containing about 0.05 parts water are mixed with about 9.0 parts by weight trimethylol propane. About 70 parts by weight of a mixture of 65 percent 2,4-toluylene diisocyanate and 35 percent 2,6-toluylene diisocyanate are added to the mixture of glycol and triol while holding the mixture at a temperature in the neighborhood of 60° C. Chemical reaction between the diisocyanate and the glycol and triol proceeds under substantially anhydrous conditions (i.e. without any water other than that mentioned above) as the temperature increases above 60° C. A thick liquid adduct or prepolymer having terminal —NCO groups is formed. This prepolymer is suitable for preparing a coating composition by including a solvent during its preparation or by dissolving it in a suitable organic solvent. Examples of such solvents include toluene, benzene, ethyl acetate, butyl acetate, and the like.

*Example 3*

About 100 parts by weight of polypropylene ether glycol prepared by condensing propylene oxide and having an average molecular weight of about 2,000 are mixed with about 0.5 part hexanetriol. About 19.5 parts of an isomeric mixture of 80 percent 2,4-toluylene diisocyanate and 20 percent 2,6-toluylene diisocyanate are mixed with the mixture of glycol and triol in an apparatus of the type disclosed in U.S. Patent 2,764,565. Chemical reaction between the isocyanates and glycol and triol is effected by heating the resulting mixture at a temperature of about 70° C. under subsantially anhydrous conditions. No catalyst is required in this reaction. The resulting prepolymer having terminal —NCO groups and containing urethane linkages and having a molecular weight of about 2400 is suitable for making cellular polyurethane by mixing it with water and a suitable tertiary amine or other catalyst.

It is to be understood that any other polyalkylene ether glycol and any other low molecular weight polyhydric alcohol free from a tertiary nitrogen atom disclosed as suitable herein may be used in place of those set forth in the foregoing examples. It is also to be understood that any of the other polyisocyanates indicated as suitable herein may be substituted for the toluylene diisocyanate used in these examples. Moreover, the reaction conditions can be varied by those skilled in the art in accordance with the process described generally herein.

Although the invention has been described in considerable detail in the foregoing for the purpose of illustration, it is to be understod that such detail is solely for this purpose and that variations can be made therein by those skilled in the art without departing from the spirit and scope of the invention except as is set forth in the claims.

What is claimed is:

1. A process for preparing a prepolymer containing urethane linkages and having terminal —NCO groups which comprises reacting an excess of an organic diisocyanate with a mixture of a polyalkylene ether glycol having an average molecular weight of at least about 350 and a hydroxyl number of not more than about 320 and a polyhydric alcohol free from tertiary nitrogen atoms and having three to six hydroxyl groups and a molecular weight of not more than about 500, said mixture containing from about 70% to about 99.5% of the said polyalkylene ether glycol and from about 0.5% to about 30% by weight of the said polyhydric alcohol, said reaction taking place under substantially anhydrous conditions.

2. The process of claim 1 wherein the polyhydric alcohol is glycerine.

3. The process of claim 1 wherein the reaction is conducted at a temperature within the range of from about 40° C. to about 140° C.

4. The process of claim 1 wherein the polyhydric alcohol is pentaerythritol.

5. The process of claim 1 wherein the polyhydric alcohol is sorbitol.

6. The process of claim 1 wherein the polyhydric alcohol is sucrose.

7. A process for preparing a prepolymer containing urethane linkages and having terminal —NCO groups which comprises reacting an excess of an organic diisocyanate with a mixture of from about 70 parts to about 99.5 parts by weight of a polyalkylene ether glycol having a molecular weight of at least about 350 and a hydroxyl number of from about 40 to about 320 and about 0.5 to about 30 parts by weight of a polyhydric alcohol having three to six hydroxyl groups and a molecular weight of not more than about 500.

8. A prepolymer having terminal —NCO groups which is prepared by reacting an excess of an organic diisocyanate with a mixture of from about 70 parts to about 99.5 parts by weight of a polyalkylene ether glycol having three to six hydroxyl groups and a molecular weight of at least about 350 and a hydroxyl number of not more than about 320 and about 0.5 to about 30 parts by weight of glycerine at a temperature of from about 40° C. to about 150° C. until a prepolymer having terminal —NCO groups is obtained.

References Cited by the Examiner
UNITED STATES PATENTS

| | | | |
|---|---|---|---|
| 2,866,774 | 12/1958 | Price | 260—77.5 |
| 2,901,467 | 8/1959 | Croco | 260—77.5 |
| 2,929,794 | 3/1960 | Simon et al. | 260—77.5 |
| 2,949,431 | 8/1960 | Britain | 260—77.5 |

LEON J. BERCOVITZ, Primary Examiner.

M. C. JACOBS, Assistant Examiner.